United States Patent [19]

Tajima et al.

[11] Patent Number: 4,835,075
[45] Date of Patent: May 30, 1989

[54] SECONDARY BATTERY USING NONAQUEOUS ELECTROLYTES

[75] Inventors: Yoshimitsu Tajima; Motoo Mohri, both of Nara; Hideaki Tanaka, Tenri, all of Japan

[73] Assignee: Sharp Kabushiki Kaisha, Osaka, Japan

[21] Appl. No.: 119,134

[22] Filed: Nov. 10, 1987

[30] Foreign Application Priority Data

Nov. 11, 1986 [JP] Japan .............................. 61-269424

[51] Int. Cl.$^4$ ............................................. H01M 6/14
[52] U.S. Cl. .................................. 429/194; 429/218; 429/105
[58] Field of Search ............... 429/194, 196, 197, 218, 429/105

[56] References Cited

U.S. PATENT DOCUMENTS

| | | | |
|---|---|---|---|
| 4,514,478 | 4/1985 | Binder et al. | 429/196 |
| 4,515,875 | 5/1985 | Bowden et al. | 429/196 |
| 4,516,317 | 5/1985 | Bailey | 429/196 X |
| 4,520,083 | 5/1985 | Prater et al. | 429/101 |

OTHER PUBLICATIONS

Electrochemical Science and Technology, vol. 125, No. 5, pp. 687–692, (May, 1978).
JPN. J. Appl. Phus., vol. 22 (1983), No. 5.

Primary Examiner—Anthony Skapars
Attorney, Agent, or Firm—Irell & Manella

[57] ABSTRACT

A secondary battery using nonaqueous electrolytes that contain a light metal as an active material, and comprising an anode, a cathode and a separator that electrically separates the anode from the cathode, wherein said anode comprises a heat-resistant porous support and a carbon material deposited on said porous support, said carbon material having the following physico-chemical properties: The mean interlayer separation of said carbon active material is in the range of 0.337 to 0.355 nm; the ratio of the Raman intensity of 1360 cm$^{-1}$ to that of 1580 cm$^{-1}$ with regard to the argon laser Raman spectra of said carbon material is in the range of 0.4 to 1.0; and said carbon material is mainly composed of a carbon having a six-membered ring structure with flat networks and having a selective orientation.

3 Claims, 3 Drawing Sheets

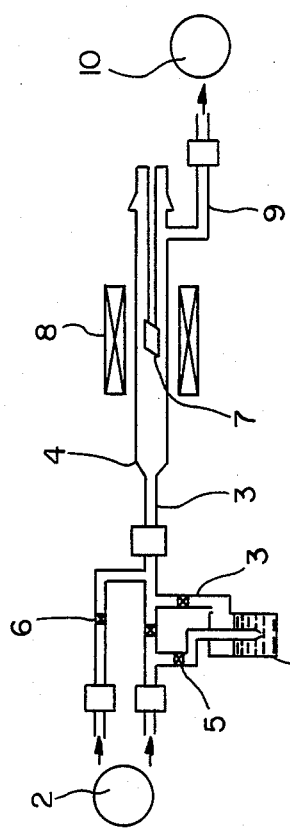
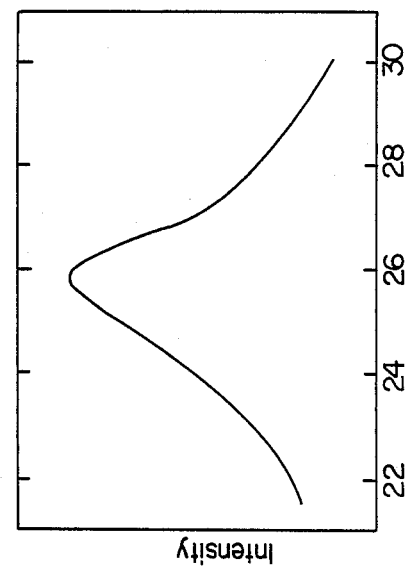

SECONDARY BATTERY USING NONAQUEOUS ELECTROLYTES

BACKGROUND OF THE INVENTION

1. Field of the Invention:

This invention relates to a secondary battery using nonaqueous electrolytes in which an electron donor such as lithium, sodium, etc., and an electron acceptor such as halogen compounds, etc., are used as a charge carrier (i.e., an active material).

2. Description of the Prior Art:

In recent years, attention has been paid to secondary batteries that use light metal such as lithium, sodium, etc. However, the practical application of a simple metal such as lithium, sodium, etc., to secondary batteries is very difficult. A simple metal used for the anode, after only a couple of cycles of electrical charge-discharges, grows dendrites which cause damage to the separator that electrically separates the anode from the cathode resulting in internal short-circuits. In order to solve this problem, metal materials such as Wood's metals with low melting points and organic materials such as graphite have been found to be able to be doped or undoped more efficiently with metal atoms such as lithium etc. However, when the above-mentioned materials are used for electrodes, a process by which these materials are deposited on an electrode substrate functioning as a current-collector becomes necessary. When metal materials such as alloys with low melting points, e.g., Wood's metals, are deposited on the substrate, a flux must be used as an adhesive adhering the metal materials to the substrate, which caused a decrease in the electrode capacity. Moreover, the flux must be removed by a washing process that necessitates a succeeding drying process, which is troublesome. Moreover, when organic materials such as graphite are deposited on the substrate, supplementary materials such as a binding agent, etc., in addition to a charge carrier, are required to adhere the organic materials to the substrate, which also causes a decrease in the electrode capacity.

On the other hand, activated charcoal or active carbon can be employed for the above-mentioned anode. However, the activated charcoal or the active carbon has a laminated structure with hexagonal networks made of carbon atoms. The lamination is irregularly formed, so that the activated charcoal or the active carbon cannot be doped with ions, but electrical doublelayers can only be formed at the interface between the active a charcoal or the active carbon and the electrolyte. Accordingly, when the activated charcoal or the active carbon is used as an anode material, the doping thereof with cations such as lithium does not take place and an electrical capacity corresponding only to the amount of ions stored in the electrical doublelayers is obtainable.

Carbon materials such as graphite having hexagonal networks of carbon atoms that are regularly disposed can be also used for the anode. They have a layered structure in which a plurality of carbon layers with hexagonal networks are laminated. The interlayer separation of the carbon layers into which dopants (i.e., active material ions) are introduced is as small as 0.3354 nm and the carbon layers are regularly laminated, which minimizes the amount of ions to be doped at around ordinary temperatures.

SUMMARY OF THE INVENTION

The inventors of this invention directed their attention to the application of carbon materials anode materials, which cannot be eluded nor decomposed, and found the following facts: Carbon materials, which have been deposited on a porous substrate by subjecting a hydrocarbon such as benzene to aw chemical vapor deposition treatment at 1500° C. or less, have a six-membered ring structure with flat networks that is a slightly more turbostratic structure than the highly oriented structure of graphite. These carbon materials also have a selective orientation. Moreover, these carbon materials having such a slightly distorted structure are readily doped or undoped with a light metal such as lithium, etc., as compared with conventional carbon materials (i.e., highly oriented pyrolitic and thermally-decomposed graphite, natural graphite, carbide of organic fibers, activated charcoal, etc.), thereby creating a large electrical capacity. These carbon materials can be directly deposited on heat-resistant substrate, without an undercoating process using fluxes and/or binding agents,- resulting in a simplified production process of secondary batteries having a small internal resistance.

The secondary battery using nonaqueous electrolytes of this invention, which overcomes the above-discussed and numerous other disadvantages and deficiencies of the prior art, comprises an anode, a cathode and a separator that electrically separates the anode from the cathode.

In a preferred embodiment, the another comprises a heat-resistant porous substrate and a carbon material deposited on the porous substrate, the carbon material having the following physico-chemical properties: The mean interlayer separation of the carbon active material is in the range of 0.337 to 0.335 nm; the ratio of the Raman intensity of 1360 cm$^{-1}$ to that of 1580 cm$^{-1}$ with regard ro the argon laser Raman spectra of the carbon active material is in the range of 0.4 to 1.0; snf the carbon material is mainly composed of a carbon having a six-membered ring structure with flat networks and having a selective orientation.

In a preferred embodiment, the carbon active material is deposited on the whole area of the porous substrate so as to form the anode.

In a preferred embodiment, the carbon active material is deposited on one side of the porous substrate so as to form the anode.

In a preferred embodiment, the carbon active material is deposited on one side of the porous substrate so as to form the anode and the portion of the porous substrate on which the carbon material is not deposited functions as the separator.

Thus, the invention described herein makes possible the objectives of (1) providing a secondary battery using nonaqueous electrolytes that can be readily manufactured because the anode is constituted without using a flux, a binding agent, etc.; (2) providing a secondary battery using nonaqueous electrolytes that has a very large electrical capacity because materials of the anode are mainly composed of carbon materials that have a slightly more turbostratic structure than the highly oriented structure of graphite and that have a selectively oriented structure, so that the doping and undoping of the anode with light-metal active materials such as lithium, sodium, etc., can be smoothly carried out; and (3) providing a secondary battery using nonaqueous electrolytes that is excellent in its charge-discharge cycle characteristics and widely useful in a variety of fields.

BRIEF DESCRIPTION OF THE DRAWINGS

This invention may be better understood and its numerous objects and advantages will become apparent to those skilled in the art by reference to the accompanying drawings as follows:

FIG. 1 is a schematic diagram showing an apparatus for the production of an anode of batteries of this invention.

FIG. 2 is a characteristic curve showing the x-ray diffraction of a carbon material of this invention.

DESCRIPTION OF THE PREFERRED EMBODIMENTS

Figure 3:
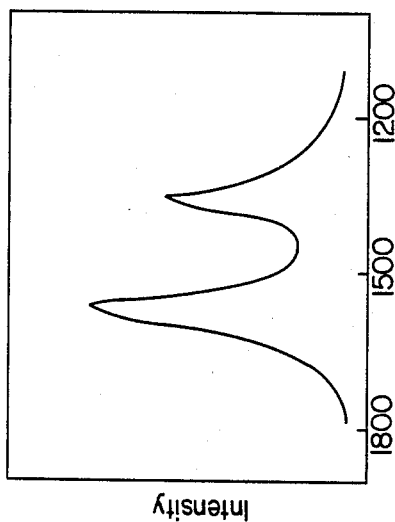
FIG. 3 is a characteristic curve showing the Raman spectra of a carbon material of this invention.

The carbon materials of this invention are deposited on a porous substrate by the chemical vapor deposition method at 1500° C. or less using hydrocarbons, examples of which are aliphatic hydrocarbons (preferably, unsaturated hydrocarbons), aromatic hydrocarbons, and alicylic hydrocarbons. These can have substituents, examples of which are halogens, hydroxyl groups, sulfo groups, nitro groups, nitroso groups, amino groups, carboxy groups. Specific examples thereof are benzene, naphthalene, anthracene, hexametylbenzene, 1,2-dibromobenzene, 2-butyne, acetylene, biphenyl, diphenylacetylene, etc., Aromatic hydrocarbons such as benzene, etc., are preferably used. Although the concentration and temperature of hydrocarbon compounds in the atmosphere to be thermally decomposed depend upon the kind of starting hydrocarbon compounds, they are ussually set to be several millimolar percent and about 1000° C., respectively. According to the boiling point of the starting hydrocarbon compound, the hydrocarbon compound is vaporized by the bubbling method in which hydrogen gas and/or argon gas is used as a carrier gas, evaporation, sublimation, etc. The vaporized hydrocarbon compound is supplied to a chemical vapor deposition chamber.

The porous substrate on which the above-mentioned carbon material is deposited must be heatresistant to the temperature of chemical vapor deposition, and it is preferably an electrical insulator. The porosity of this substrate must be high enough to smoothly achieve ionic conduction. The substrate is, for example, formed into a net or cloth, but it must be excellent in holding electrolytes. The substrate is, for example made of materials composed mainly of inorganic oxides such as glass paper, glass wool, ceramic paper, ceramic plate, etc. The shape of the substrate depends upon the structure of a desired secondary battery.

The carbon material is deposited on the whole area of the above-mentioned porous substrate or one side of the porous substrate by chemical vapor deposition. The wording "the whole area" means the whole surface of the porous substrate, but it includes the inside of the holes of the porous substrate when the porosity of the substrate is high. The wording "one side" also includes the inside of the holes of the porous substrate when the porosity of the substrate is high. Especially, when the above-mentioned carbon material is deposited on one side of the substrate by the use of a masking substance, etc., the portion of the substrate on which the carbon material is not deposited can function as a separator. Accordingly, if the cathode is directly positioned on the said portion of the substrate, an anode / separator / cathode structure can be readily constituted without using a separating substance. That is, when the active material is deposited on one side alone of the substrate, the resulting cathode can provide a separator.

The carbon material deposited on the substrate as mentioned above is mainly composed of carbon having a slightly more turbostratic structure than the highly oriented structure of graphite and having a selectively oriented structure. The carbon structure has the above-mentioned physicochemical properties. The interlayer separation of the carbon material, 0.337to 0.355 nm, is evaluated by x-ray diffractometer, but the size of the unit crystal in the c-axis direction determined from half-width value of the reflection peak is desirable 2.00 nm to 10.00 nm. The orientation of the said carbon material can be defined by the reflecting high energy electron diffraction method. The resulting diffraction pattern is of a board ring shape, indicating that the unit crystal is very small. More particularly, the broad ring is not uniformly formed, but it is composed of arcs or spots. The relative inclination in the c-axis direction between the unit crystals is in the range of −75 to +75 degrees, preferably −60 to +60 degrees.

The interlayer separation of the above-mentioned carbon material, i.e., 0.337 nm to 0.355 nm, is slightly longer than that of natural grphite (e.g., graphite available in madagascar), 0.335 nm. The half-width value of the reflection peak of the carbon material, e.g., $2\ominus = 2.0$ degrees, is considerably greater than that of the reflection peak of graphite. As mentioned above, since the interlayer separation of the carbon material is greater than that of natural graphite, the carbon material can be doped or undoped with a light metal (i.e., an electron donating substance) such as lithium, sodium, etc. This phenomenon takes place electrochemically and is reversible.

The raman scattering method is generally used as an indication by which the proceding of graphitization of carbon materials is observed. In general, carbon materials, which have planes with flat networks of six-membered rings, have a Raman scattering peak at around 1360 $cm^{-1}$ resulting from expansion, contraction and/or vibration of the said planes and have a scattering peak at around 1580 $cm^{-1}$ resulting from vibration taking place between the said planes.

As the graphitization of the carbon materials proceeds, the peak of 1360 $cm^{-1}$ decreases and the peak of 1580 $cm^{-1}$ increases. The ratio of the Raman intensity of 1360 $cm^{-1}$ to the Raman intensity of 1580 $cm^{-1}$ with regard to the carbon material that is used in this invention is in the range of 0.4 to 1.0, so that the carbon material can be electrochemically and reversibly doped or undoped with a light metal (i.e., an electron donating substance) such as lithium, sodium, etc.

According to a method by which from diffraction angle corresponding to (002) reflection peak of a carbon material having planes with flat networks of six-membered-rings, the size of the unit crystal in the c-axis direction corresponding to the direction vertical to the said planes is determined, carbon materials that have a mean interlayer separation ranging from 0.355 nm and that have unit crystals with a size ranging from 2.00 nm to 10.00 nm in the c-axis direction have excellent electrode characteristics. Moreover, the diffraction angle corresponding to (110) reflection peak in the ab-axis direction that corresponds to the direction horizontal to the planes with flat networks of six-membered rings does not exist or is very broad. This phenomenon indicates that the unit crystal in the ab-axis direction is small.

Also, according to the reflecting high energy electron difraction method by which the orientation of carbon materials is examined, carbon materials that have a relative inclination in the c-axis direction between the unit crystals defined to be in the range of $-75$ to $+75$ degrees have excellent electrode charge-discharge characteristics. Carbon materials having a broad-ring shaped difraction pattern exhibit remarkably excellent characteristics. Carbon material whose ring shape is not uniform but composed of arcs or spots shows good characteristics. These rings result from (002), (004) and (006) reflections. Due to the shape of the rings, the c-axes of the unit crystals of the said carbon material are uniformly oriented within the above-mentioned range, thereby exhibiting excellent charge-discharge characteristics.

As a nonaqueous electrolyte used in the batteries of this invention, a solution of dimetyl sulfoxide, $\gamma$-butyrolactone, propylene-carbonate, sulfolane, tetrahydrofuran, 2-methyltetrahydrofuran, 1,2-dimethoxyethane, 1,3-dioxolane containing lithium perchlorate, lithium hexafluoroarsenate, lithium boroflouride, triflouro lithium sulfonate, or a mixture thereof can be used.

As the cathode metal oxides such as vanadium pentoxide, niobium pentoxide, bisumuth sesquioxide, antimony sesquioxide, chromium sesquioxide, chromium trioxide, molybedenum trioxide, tungsten trioxide, selenium dioxide, tellurium dioxide, manganese dioxide, iron sesquioxide, triiron tetroxide, nickel trioxide, nickel oxide, cobalt trioxide, cobalt oxide, etc., and metal chalcogen compounds such as titanium sulfide, zirconium sulfide, hafnium sulfide, tantalum sulfide, molybdenum sulfide, tungten sulfide, titanium selenide, zirconium selenide, hafnium selenide, vanadium selenide, niobium selenide, molybdenum selenide, tungsten selenide, etc., a complex thereof or a mixture thereof can be used.

Although the anode and cathode are disposed so as to sandwich a know separator. According to this invention, the above-mentioned anode that is provided with a separator can be used together with the cathode, resulting in an anode / separator / cathode structure, which is then impregnated with an amount of the above-mentioned nonaqueous electrolyte. Thereafter, the anode provided with a separator and the cathode are placed within anode and cathode housings, respectively. Both housings are electrically separated from each other by a sealing substance, resulting in a battery of this invention.

EXAMPLE 1

The carbon material of this invention, which was mainly made of carbon having a slightly turbostractic structure, as compared with the highly oriented structure, of graphite, and having a selectively oriented structure, was prepared, using a reaction apparatus shown in FIG. 1, as follows: To a vessel 1, which contained benzene that had been dehydrated and refined by vacuum distillation, argon gas was supplied from an argon gas supplier 2 so as to bubble the benzene. Then, the benzene was supplied to a quartz reaction tube 4 through a Pyrex glass tube 3. At this time, the container was heated to compensate for energy loss due evaporation of the benzene, so that the liquid benzene in the vessel 1 could be maintained at a fixed temperature, and the flow rate of the argon gas was controlled by values 5 and 6 so that the amount of benzene to be suplied into the reaction tube 4 could be controlled at a fixed level. In the reaction tube 4, there was provided a sample holder 7 on which a porous ceramic paper (15 mm$\phi\times$0.6 mm) of alumina silicate that is nonconductive was placed. There was a furnace 8 surrounding the outside of the reaction tube 4. This furnace 8 kept the holder 7 and the ceramic paper on the holder at about 1000° C. When benzene was supplied into the reaction tube 4 through the Pyrex glass tube 3, the benzene was thermally-decomposed within the reaction tube 4. The thermally-decomposed benzene was deposited as a carbon material (the thickness thereof being about 1 $\mu$m) on the ceramic paper taking 60 minutes. The gas remaining in the reaction tube 4 was removed via gas-ejection systems 9 and 10.

The x-ray diffraction for the resulting carbon material with the CuK$\alpha$ rays is shown in FIG. 2 and the Raman spectra thereof are known in FIG. 3. FIGS. 2 and 3 indicate that the mean interlayer separation of the carbon material of this example is 0.345 nm and that the ratio of the Raman intensity of 1360 cm$^{-1}$ to that of 1580 cm$^{-1}$ with regard to the Raman spectra of the carbon material is 0.80, respectively. Moreover, the size of the unit crystal in the c-axis direction determined from half-width value of the peak was 2.72 nm. The orientation of each unit crystal determined by the reflecting high energy electron diffraction method was in the range of $-18$ to $+18$ degrees in the c-axis direction, indicating that each unit crystal of the carbon material has an excellent orientation. Natural graphite that was available in Madagascar was exanined as a control samiple in the same manner as the above-mentioned carbon material of this example with regard to the x-ray diffraction and the Raman scattering method. The mean interlayer separation of the natural graphite was 0.360 cm$^{-1}$ to that 1580 cm$^{-1}$ *with regard to the Raman spectra of the natural graphite was* 0.1. Although the mean interlayer separation of the carbon material of this example is close to that of the natural graphite, the Raman band reflecting the turbostratic structure of a crystal at 1360 cm$^{-1}$ is remarkably different between the carbon material of this example and the natural graphite of a control sample, with indicates that the carbon material of this example has a more turbostractic structure than the highly oriented structure of the natural graphite.

EXAMPLE 2

Figure 5:
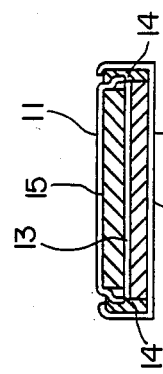
FIG. 5 is a cross-sectional view showing a battery using a nonaqueous electrolyte of this invention.
Figure 4B:
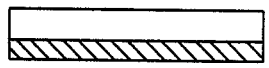
FIG. 4b is a side view showing another anode of this invention provided with a separator.
Figure 4A:
FIG. 4a is a side view showing an anode of this invention.

According to Example 1, a carbon material that was mainly made of carbon having a slighty more turbostractic structure than the highly oriented structure of graphite and having a selectively oriented structure was deposited on the whole area (i.e., both sides) of a ceramic plate as shown in FIG. 4a, resulting in an anode (15 mm$\phi\times$0.6 mm) 11. Chrome trioxide which is an active material for cathodes was heat-treated at 260° C.

within a pressure container to form an oxide, $Cr_3O_8$. Powder of the oxide was admixed with polyethylene powder as a binding agent and acetylene black as an electrical conducting agent. The mixture was then formed into a cathode (15 mm$\phi \times$ 0.6 mm) 12 by a molding technique under conditions of a high temperature of 120°C. and a high pressure of 300 kgcm$^{-2}$. The anode 11, the cathode 12 and a porous polyethylene separator (the thickness thereof being 0.2 mm)13 were impregnated with an amount of electrolyte (i.e., a solution of propylene carbonate containing 1M lithium perchlorate. Then, they were placed withing anode and cathode housings 15 and 16 that are electrically separated by a sealing substance 14, resulting in a coin-shaped battery A as shown in FIG. 5.

EXAMPLE 3

According to Example 1, a carbon material that was mainly made of carbon having a slightly more turbostratic structure than the highly oriented structure of graphite and having a selectively oriented structure was deposited on one surface of a ceramic plate as shown in FIG. 4b, resulting in an anode having a separator. A cathode was made in the same manner as that of example 2. The anode with the separator and the cathode were impregnated with an amount of electrolyte (i.e., a solution of prophylene carbonate containing 1M lithium perchlorate) and then placed within anode and cathode housings, resulting in a coin-shaped battery B.

CONTROL 1

A carbon material that was mainly made of carbon having a slightly more turbostratic structure than the highly oriented structure of graphite and having a selectively oriented stttructure was deposited on quartz plate by the use of the apparatus described in Example 1. The carbon material was removed from the quartz plate and powdered by means of an alumina mortar. The powdered carbon material was then admixed with polyethylene powder as a binding agent and acetylene black as an electrical conducting agent, and subjected to a molding treatment at 120° C. under 300 Kg cm$^{-2}$ so as to form an anode. Chrome trioxide as a cathode active-material was heat-treated at 260° C. within a pressure container to form an oxide, $Cr_3O_8$. Powder of the oxide was admixed with polyethylene powder as a binding agent and acetylene black as an electrical conducting agent and subjected to a molding treatment at 120° C. under 300 Kg cm$^{-2}$ so as to form a cathode. The anode, the cathode and a polyethylene separator were then impregnated with an amount of electrolyte that was a solution of polyethylene carbonate containing 1M lithium perchlorate. Then, they were placed within anode and cathode housings, resulting in a coin-shaped battery C.

CONTROL 2

A cathode that was made of $Cr_3O_8$ in the same way as in Example 2, an anode that was made of a metal lithium foil, a separator that was made of polyethylene, and an electrolyte that was a solution of propylene carbonate containing 1M lithium perchlorate were used to construct a coin-shaped battery D.

Figure 6:
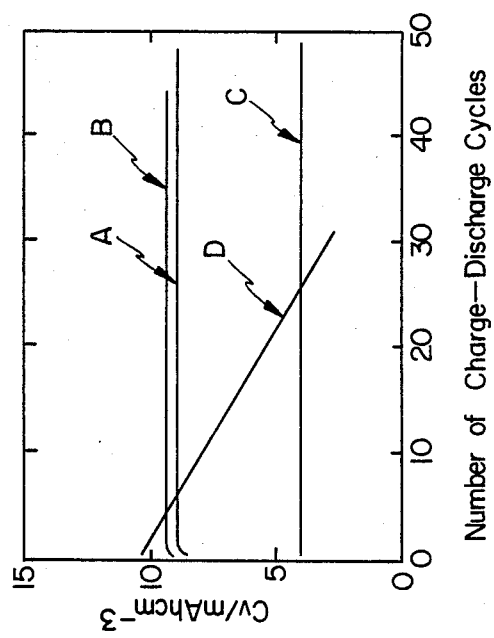
FIG. 6 is of characteristic curves showing the dependence of the discharging capacity per unit cubic volume on the charge-discharge cycle with regard to each of the batteries A to D wherein bateries A and B are test samples and batteries C and D are control samples.

The above-mentioned batteries A to D were repeatedly charged and discharged by current corresponding to five hour discharge rate, and the relationship between the number of charge-discharge cycles and discharging capacity of these batteries is shown in FIG. 6, indicating that the batteries A and B of this invention have a large discharging capacity per a unit cubic volume and provide a stabilized discharging capacity for a long period of time.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalent thereof by those skilled in the art to which this invention pertains.

What is claimed is :

1. A secondary battery using a nonaqueous electrolyte that contains a light metal, said battery comprising an anode, cathode and a separator that electrically separated the anode from the cathode, Wherein said anode comprises a heat-resistant porous substrate and a carbon material deposited on said porous substrate, said carbon material having the following physico-chemical properties: The mean interlayer separation of said carbon material is in the range of 0.337 to 0.355 nm; the ratio of the Raman intensity of 1360 cm$^{-1}$ to that of 1580 cm$^{-1}$ with regard to the argon laser Raman spectra of said carbon material is in the range of 0.4 to 1.0; and said carbon material is mainly composed of a carbon having a six-membered ring structure with flat networks and having a selective orientation.

2. A secondary battery according to claim 1 wherein said carbon material is deposited on the whole area of the porous substrate so as to form the anode.

3. A secondary battery according to claim 1, wherein said carbon material is deposited on one side of the porous substrate so as to form the anode and the portion of said porous substrate on which the carbon active material is not deposited functions as the separator.

* * * * *